July 14, 1970   GENJI USUDA   3,520,033
STRAP FASTENER
Filed Nov. 4, 1968
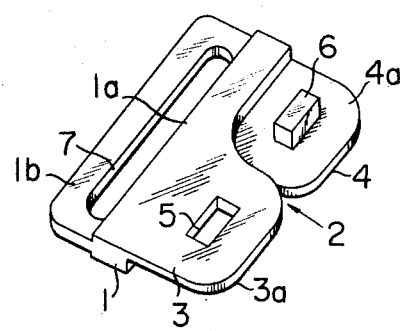
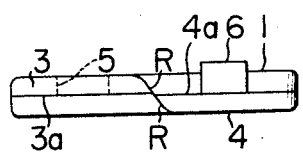
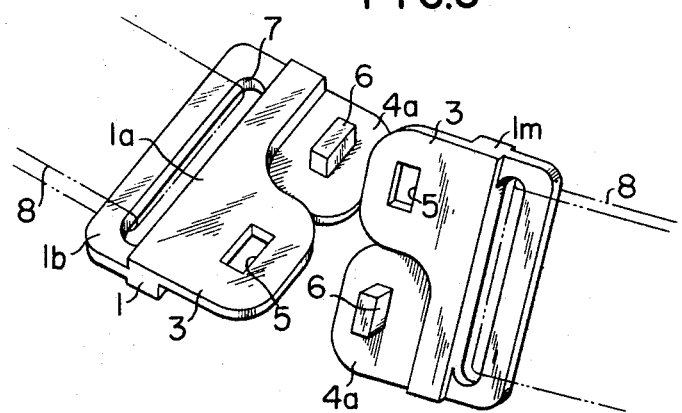
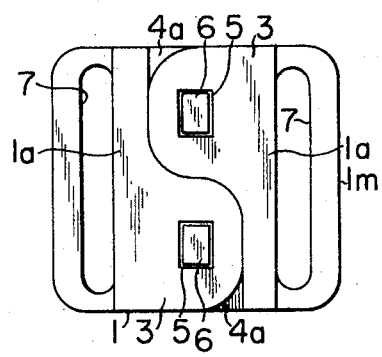
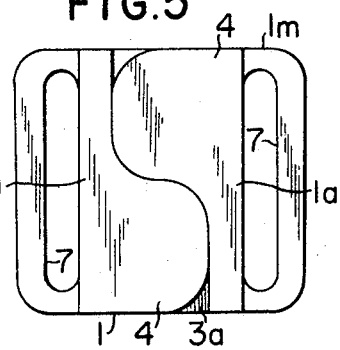
INVENTOR.
GENJI USUDA United States Patent Office 3,520,033
Patented July 14, 1970

3,520,033
STRAP FASTENER
Genji Usuda, Tokyo-to, Japan, assignor to Kabushiki Kaisha Okuto, Osaka-shi, Osaka-fu, Japan
Filed Nov. 4, 1968, Ser. No. 773,033
Claims priority, application Japan, Nov. 15, 1967, 42/73,521
Int. Cl. A44b 17/00
U.S. Cl. 24—201                                5 Claims

ABSTRACT OF THE DISCLOSURE

A strap-end fastener consisting of two identical fastener halves, each half having a latch member, an engagement hole, and a recess engageable for fastening respectively with an identical engagement hole, identical latch member, and identical recess in the other fastener half. The two halves can be fastened merely by bringing the halves together and rotating them relative to each other in one direction and can be unfastened merely by a rotation thereof in the opposite direction.

BACKGROUND OF THE INVENTION

This invention relates generally to fasteners and more particularly to strap fasteners for joining two loose strap ends. More specifically, the invention concerns a new and improved two-part strap fastener suitable for use not only as a buckle for ordinary belts but also as a fastener for various other straps and strap-like articles.

The strap fastener of the invention is particularly suitable for use in conjunction with the straps of apparel such as women's brassieres and bathing suits having straps which are fastened in the back. As is well known from daily experience, the fastening and unfastening of straps of such apparel in the back are extremely difficult and troublesome.

SUMMARY OF THE INVENTION

It is an object of the present invention to provide a strap fastener of simple organization and operation which can be easily and positively fastened and unfastened even when used in the back parts of such apparel as mentioned above and even in the dark.

Another object of the invention is to provide an economical strap fastener of two-part (male-female) type in which the two parts are identical and interchangeable, having a hermaphroditic, mutually intercoupling configuration, and which is adaptable to quantity (mass) production.

Still another object of the invention is to provide a highly safe and reliable strap fastener which, once fastened, will not accidently become unfastened and can be unfastened only when intentionally manipulated for unfastening.

A further object of the invention is to provide a strap fastener having the above stated features which is of compact size and can be made to have an extremely small thickness in the assembled and fastened state, and which, while being capable of presenting an aesthetically pleasing appearance and thereby being useful as a decorative article, can also be made very light in weight and inconspicuous in appearance to blend harmoniously with the straps on which it is used.

According to the present invention, briefly summarized, there is provided a strap fastener of the above stated character made up of two identical fastener halves, each half being an integral structure having two tabs lying in two staggered parellel planes and disposed in mutually unsuperposed positions symmetrically on two sides of a recess for engagement with an identical recess in the other fastener half, a latch member projecting from one tab, an engagement hole in the other tab, the latch member and engagement hole being adapted to engage respectively with an identical engagement hole and an identical latch member in the other fastener half for fastening, and means for connecting the fastener half to strap end.

The nature, details, and utility of the invention will be more clearly apparent from the following detailed description with respect to a preferred embodiment of the invention when read in conjunction with the accompanying drawing, in which like parts are designated by like reference numerals and characters.

BRIEF DESCRIPTION OF THE DRAWING

In the drawing:

FIG. 1 is a perspective view showing one half (part) of an example of a strap fastener embodying the invention;

FIG. 2 is an outer edge-on view of the fastener half shown in FIG. 1, the planar rear side being shown as facing upward;

FIG. 3 is a perspective view showing the two halves of the fastener in installed state on straps and indicating a step in the fastening (or unfastening) procedure;

FIG. 4 is a planar rear view of the fastener halves in fastened state; and

FIG. 5 is a planar front view of the fastener halves in fastened state.

For consistency in designating sides and directions, the following designations are herein used. The strap attachment side of each fastener half is referred to as the inner side, and the opposite side remote from the strap is called the outer side. The planar rear and front sides are as shown in FIGS. 4 and 5, respectively. The lateral left and right sides of each fastener half are the lateral left and right sides, respectively, of the front side as viewed from the inner side toward the outer side.

DETAILED DESCRIPTION

The fastener of the invention consists of two identical halves, each of which is in the form of an integral plate structure 1 perpendicular to the front-to-rear direction with a convergent recess 2 in the center of the outer edge extending toward the inner side as shown in FIGS. 1 and 2. On the left and right sides of this recess 2 as a division region, the plate structure 1 has mutually similar and symmetrical tabs 3 and 4 of planar shape disposed in respective parallel planes which are staggered or joggled in the front-to-rear direction and are perpendicular thereto.

The left tab 3 has a front planar surface 3a lying in substantially the same plane as the rear surface 4a of the right tab 4. The left and right tabs 3 and 4 are integrally joined to and extend outward from a common base part 1a of the plate structure 1, which base part 1a is integrally joined to an inner flange 1b extending inwardly therefrom and having a strap slot 7 therein in the lateral direction for attachment of a strap 8 as indicated by two dot-and-dash lines in FIG. 3.

The left tab 3 is provided through its center with an engagement hole 5 for receiving and engaging with a latch member 6 on the right tab 4 of the other fastener half 1m, while the right tab 4 is provided on its rear surface 4a at the center thereof with a latch member 6 for insertion into and engagement with a corresponding engagement hole 5 in the left tab 3 of the other fastener half.

The other fastener half 1m is identical in shape and dimensions to the fastener half 1, the shapes, dimensions, and positions of the latch members 6, their mating engagement holes 5, and recesses 2 of the two fastener halves and the elastic property thereof being such that the members 6 fit neatly into place with a snap action into their respective holes 5 and are then retained therein by friction when the two halves are fastened as described below.

The two halves 1 and 1m of the strap fastener of the above described construction according to the invention are fastened together in the following simple manner.

The two fastener halves are brought together in opposition with their outer sides facing each other and with their planes mutually canted at an angle of approximately 30 to 40 degrees about an axis in the outer-inner direction as indicated in FIG. 3. The two halves are then brought closer together so that the recesses 2, 2 thereof mesh with each other, and the two halves are then rotated (clockwise in the example illustrated) relative to each other about an axis in the outer-inner direction passing through the recesses 2 thereby to cause their latch members 6 to snap into engagement with their corresponding engagement holes 5. The fastener halves 1 and 1m are thus fastened to each other.

Since the front surface 3a of the left tab 3 and the rear surface 4a of the right tab 4 of each fastener half lie in substantially the same plane, the strap fastener thus fastended becomes a unitary structure of plate form of relatively small thickness. The strap-fastener in fastened state is shown in FIGS. 4 and 5.

To unfasten the strap fastener thus fastened, the fastener halves are merely rotated in the opposite direction (counterclockwise in the example illustrated) relative to each other and separated.

The edges of the recesses 2 are preferably provided with amply rounded corners as indicated by character R in FIG. 2 thereby to facilitate the above described meshing and engagement of the fastener halves.

The strap fastener halves of the invention can be made of any suitable metal or synthetic resin. Synthetic resins of sufficient strength and elasticity are preferred for applications wherein the strap fastener tends to be in contact with the user's skin. Synthetic resins are also preferred because the strap fastener halves of the invention can be readily produced therefrom to precise dimensions in large quantities and at low cost.

As indicated briefly hereinabove, the recesses 2 in the two fastener 1 halves have the important function of meshing with each other to a precise depth of engagement and relative positions such that the latch members 6 are aligned to engage accurately with their corresponding engagement holes 5. These recesses 2, particularly at their entrance parts, also have the important function of guiding the two fastener halves into correct engagement and alignment.

Accordingly, the strap fastener according to the invention can be easily fastened and unfastened at the back of the user's body, in the dark, or with the user's eyes closed or looking away from the fastener. That is, the strap fastener can be readily fastened and unfastened by only tactile feel without being visible.

Another advantageous feature of the invention is that, since the two fastener halves are identical in shape and dimensions to each other as described above, two strap fasteners can be produced with only one part item. This feature affords not only low cost of production but also convenience in replacement of damaged or otherwise unusable halves and elimination of the necessity for matching two different (male and female) parts constituting each fastener.

Furthermore, once the strap fastener of the invention is fastened, the two halves cannot separate unless they are rotated relative to each other in the unfastening direction. Therefore, the strap fastener is highly safe and reliable in operation without any possibility of accidental unfastening.

While the invention has been described above with respect to a specific example of preferred embodiment of the invention, it will be apparent that the shape and configuration of each fastener half can be variously modified without departing from the spirit and scope of the invention. For example, while the latch member 6 and the corresponding engagement hole 5 are of rectangular shape in the illustrated example, they can be of any other suitable shape such as, for example, a cylindrical shape.

Furthermore, the planar shape of the strap fastener in fastened state need not be substantially rectangular as in the illustrated example but may be of any other reasonable shape. In addition, the front surface of the fastener halves, particularly in their tab parts 4, need not be flat and plain as shown in FIG. 5 but may be provided with a sculptural relief for decorative purposes.

I claim:
1. A strap fastener consisting of two identical fastener halves adapted to be atached to respective strap ends and to be mutually fastened and unfastened, each of said fastener halves comprising, in integral combination: left and right tabs lying in respective, parallel and spaced apart planes and disposed in mutually unsuperposed positions on left and right sides of a recess for engagement with an identical recess in the other fastener half; a latch member projecting from one of the tabs; an engagement hole in the other tab, said latch member and engagement hole being adapted to engage respectively with an identical engagement hole and an identical latch member in the other fastener half for fastening; and means for connecting the fastener half to the strap end.

2. The strap fastener as claimed in claim 1 in which the latch member in each of the fastener halves is of rectangular shape, and the engagement hole in the other fastener half is of a corresponding shape for positive engagement therewith.

3. The strap fastener as claimed in claim 1 in which the latch member in each fastener half is of cylindrical shape with an axis in the direction of its projection from its tab, and the engagement hole in the other fastener half is of a cylindrical shape for positive engagement therewith.

4. The strap fastener as claimed in claim 1, which, in fastened state, has a substantially plate-like shape of relatively small thickness.

5. The strap fastener as claimed in claim 1, in which each fastener half is a molded synthetic resin structure.

References Cited

UNITED STATES PATENTS 877,892   1/1908   Jennings _____ 287—64

FOREIGN PATENTS 866,047   6/1941   France.

BERNARD A. GELAK, Primary Examiner

U.S. Cl. X.R.

287—64